2,996,136
SERVO STEERING MECHANISM FOR MOTOR VEHICLES
Friedrich K. H. Nallinger, Stuttgart, and Heinz K. Stäbler, Stuttgart-Bad Cannstatt, Germany, assignors to Daimler-Benz Aktiengesellschaft, Stuttgart-Unterturkheim, Germany
Filed July 15, 1957, Ser. No. 671,926
Claims priority, application Germany July 18, 1956
19 Claims. (Cl. 180—79.2)

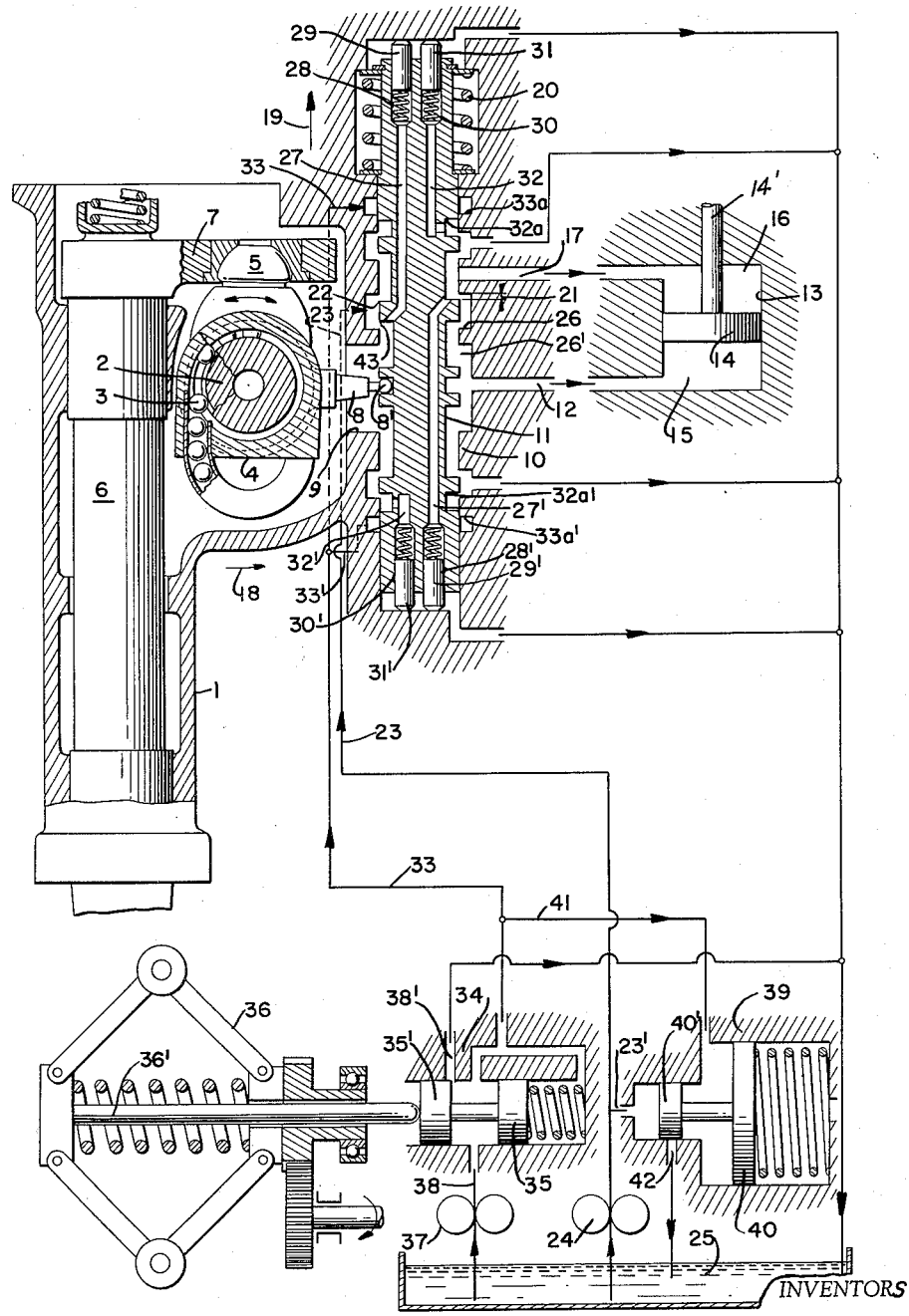

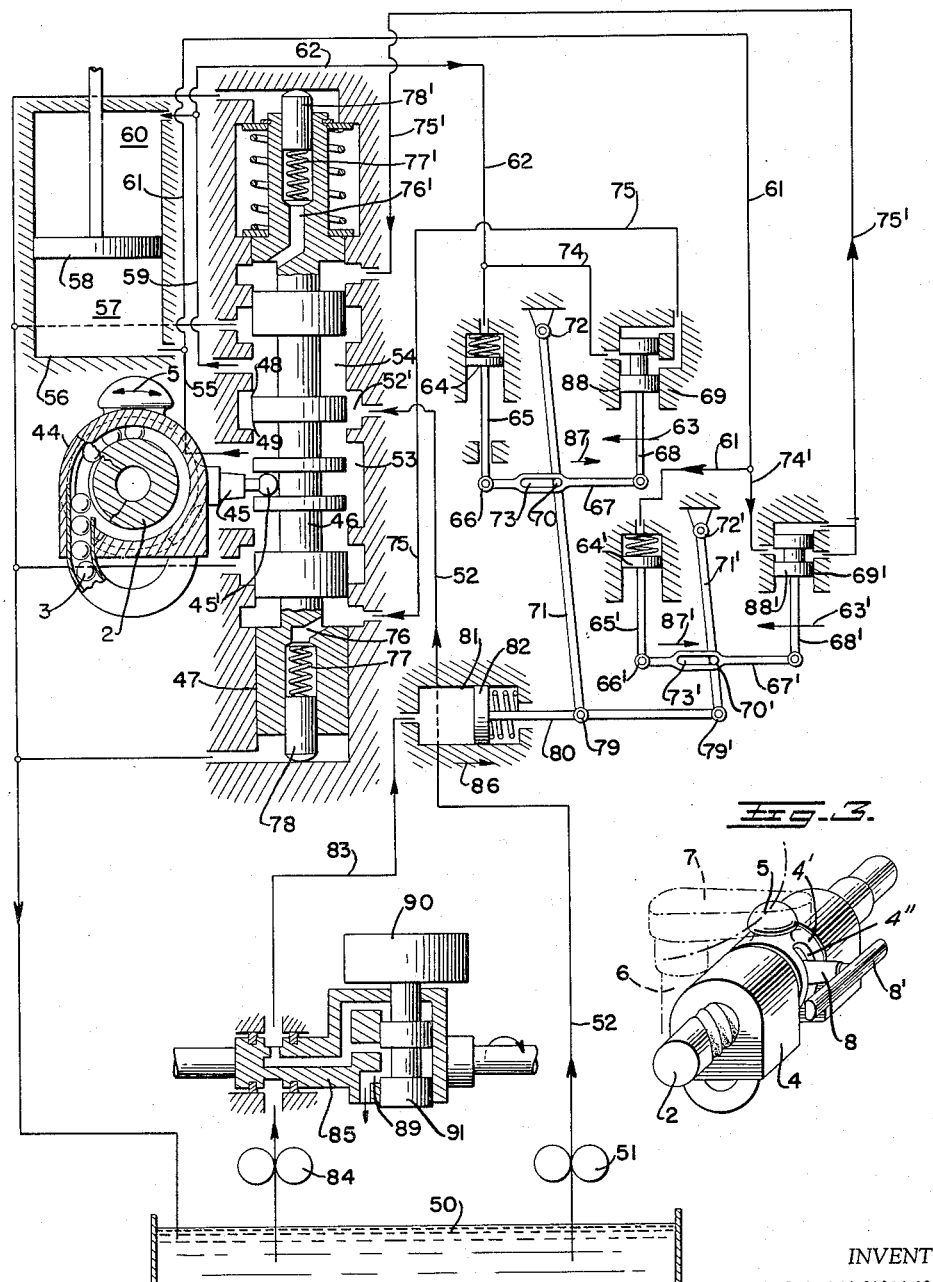

The present invention relates to a servo-steering mechanism for motor vehicles in which the manual steering is aided by a hydraulically operated piston arranged in a servo motor, the action of which is controlled by a control-valve plunger operated by an actuating member which responds to small rotational movements of the steering wheel and in which means are provided by which the pressure in the servo motor is regulated infinitely variably in dependence on the speed of the vehicle, preferably in an inverse ratio thereto, as, for instance, in such a manner that at zero vehicle speed or at slow vehicle speeds servo assistance to steering is greatest while this assistance diminishes as the vehicle speed increases or even may become zero at a predetermined vehicle speed.

The purpose of the present invention resides in the adaptation, by simple means, of the function of the servo-steering mechanism to the practical requirements thereof during steering of motor vehicles, particularly to the prevailing condition that the steering is harder when the vehicle is at rest or travels at low speed than it is when it travels at high speed.

At high vehicle speed it is, for instance, desirable to avoid that oversteering by the servo-steering mechanism or, as it is often called "overtravel of steering" takes place. The safety during vehicle travel is to be directly increased thereby.

The present invention, accordingly, consists essentially in the provision within the servo mechanism of a centrifugal governor which is drivingly connected with the vehicle wheels, the drive shaft thereof or any other parts that rotate at a constant ratio in relation to the speed of the vehicle, which is operatively connected with the servo-steering mechanism and which actuates, preferably by hydraulic means, the control valve plunger controlling the servo motor as the vehicle speed increases in the direction opposite to that imposed thereon by the actuating member responsive to small rotational movements of the steering wheel, namely in the direction towards the neutral position thereof.

Advantageously, the centrifugal governor is combined with a control valve, which itself controls or valves a fluid circuit separate from that of the servo motor and preferably supplied by a separate pump, for establishing a pressure in this fluid circuit whose magnitude is proportional to the vehicle speed and which acts directly or indirectly on the control valve plunger that controls the action of the servo motor.

According to a further characteristic of the present invention, control plungers are slidably arranged in bores forming cylinder spaces which are located at both ends of the control-valve plunger and which are disposed substantially parallel to the axis thereof while springs are additionally provided in the spaces between the bottoms of the respective bores and the pressure sides of the control plunger so as to permanently press the control plunger against the housing of the control-valve plunger to prevent rattling during driving. Furthermore, the bores are in communication with passages in the control-valve plunger through which the fluid pressure, determined by the control valve, acts on the control plungers.

The control valve itself may appropriately also be constructed as a centrifugal governor.

Appropriately, provisions may be made so that the pressure in the hydraulic circuit, controlled by the control valve, acts on a regulating piston which, over a suitable link arrangement, correspondingly shifts the pivot point of the scale beam of a piston pressure balance; the fluid pressure prevailing in the servo motor is made to act on one of the pistons of equal area of the piston pressure balance while the other piston of the piston pressure balance constructed as a pressure reducing valve, reduces the fluid pressure in the servo motor circuit in proportion to the position of the pivot point of the scale beam and therewith on the speed of the vehicle while, at the same time, this reduced fluid pressure is made to act on the control plunger in the control-valve plunger by a suitable connecting line.

Preferably, two piston pressure balances may be arranged in parallel to each other whereby one is in communication with the cylinder on one side of the servo-motor piston and the other with the cylinder on the other side of the servo-motor piston.

The control pistons in the ends of the control-valve plunger may, according to a further feature of the present invention, be arranged advantageously parallel to preferably similarly formed restoring plungers which are acted upon by the pressure of the hydraulic medium in the servo motor when the control valve plunger has been axially displaced and which have the tendency of returning the control-valve plunger in the direction toward the initial or neutral position thereof.

Furthermore, a plunger-type valve may be arranged in the connecting line from the control valve to the control-valve plunger of the servo motor, which plunger-type valve is acted upon by a pressure at one side of the plunger thereof which is dependent on the vehicle speed and in dependence thereon influences the delivery of the pressure medium to the control valve of the servo motor by opening of a discharge passage.

Accordingly, it is an object of the present invention to provide a steering mechanism, and particularly a power steering mechanism for motor vehicles in which the magnitude of assistance to the manual steering varies with the speed of the vehicle.

Another object of the present invention is to provide a power steering mechanism in which the magnitude of assistance to manual steering diminishes as the speed of the vehicle increases.

A still further object of the present invention is to provide a steering mechanism and particularly a power steering mechanism for motor vehicles in which oversteering or over-travel of the steering wheel at higher vehicle speeds is avoided.

A further object of the present invention resides in the provision of a power steering mechanism in which the magnitude of assistance to manual steering at zero or low vehicle speed is greater than at high vehicle speed.

Still another object of the present invention is to provide a servo-steering mechanism for vehicles in which assistance to manual steering ceases completely at a predetermined vehicle speed.

A still further object of the present invention is to provide a power-steering mechanism which assures as much as possible the operating safety of the vehicle during steering thereof at all speeds.

Another object of the present invention resides in the provision of a control arrangement for power-steering mechanism which controls the pressure of the servo system inversely in proportion to the vehicle speed.

These and other objects, features and advantages of the present invention will become more obvious from the following description when taken in connection with the accompanying drawing, which shows, for purposes of illustration only, several embodiments in accordance with the present invention and wherein:

FIGURE 1 is a cross-sectional view of the servo-steering mechanism in accordance with the present invention taken through the steering shaft and the control-valve plunger in a plane perpendicular to the longitudinal axis of the steering column;

FIGURE 2 is a cross-sectional view of a servo-steering mechanism in accordance with the present invention similar to that of FIGURE 1 but incorporating a modified control mechanism for the pressure in the servo motor, and FIGURE 3 is a partial perspective view of the steering gear nut assembly in accordance with the present invention to provide for relative movement between certain parts as will appear more fully hereinafter.

Referring now to the drawing, wherein like reference numerals are used throughout the various views to designate like parts, and more particularly to FIGURE 1, reference numeral 1 designates therein the housing of the servo-steering mechanism through which extends, in the longitudinal direction thereof, the steering spindle 2 to which the steering wheel (not shown) is attached. A steering gear nut member 4 is in engagement with the steering spindle 2 by means of one or several endless chains of anti-friction means formed by anti-friction balls 3 which engage in helical grooves formed by complementary grooves provided on the outside of steering spindle 2 and on the inside of the steering gear nut member 4 as is well known with such steering motion transmitting devices. With such an arrangement, a rotational movement of the steering spindle 2 produces a corresponding axial movement of the steering gear nut member 4 as is well known.

A steering gear nut sleeve member 4' (FIGURE 3) is placed over the outside of the steering gear nut member 4 in such a way that it is able to rotate freely thereon but is prevented from moving in an axial direction in relation to the steering gear nut member 4. An opening 4" in the sleeve member 4' (FIGURE 3) is provided so that the actuating arm 8 to be described more fully hereinafter may perform a limited rotational movement without effecting a movement of the sleeve member 4' or vice versa.

A semi-spherically-shaped ball member 5 is secured to or formed integral with the sleeve member 4' which ball member 5 transmits the axial movement of the steering gear member 4 through the sleeve member 4' to convert it into a rotational movement of the steering shaft 6 by way of lever 7, attached thereto. For that purpose, the steering gear sleeve member 4' is so mounted on nut member 4 as to preclude any relative axial movement therebetween, for example, by being seated in an appropriate circular recess provided therefor in nut member 4 as shown in FIGURE 3 or by suitable abutment shoulders or the like.

The steering gear nut member 4 is provided with an actuating member connected thereto or formed integrally therewith and formed as a lever 8 which extends through opening 4" provided in the steering gear nut sleeve member 4' and through an opening 9 into the housing 10, attached to the housing 1, to engage the collar of a control valve plunger 11 slidably arranged within housing 10. The steering gear nut member 4 together with the actuating arm 8 is rotated in response to small rotational movements of the steering wheel and steering spindle 2 as will become more clear from the description of the operation hereinafter.

A line or passage 12 leads to the chamber 15 of the servo cylinder 13 which is divided into two chambers 15 tached to the servo piston 14 is operatively connected and 16 by the servo piston 14. The piston rod 14' attached with a part of the steering mechanism that influences or brings about steering of the vehicle. The cylinder 16 is in communication with the housing 10 of the control-valve plunger 11 by way of passage or line 17.

A spring 20 accommodated between appropriate retainer disks is disposed at the top of the control valve plunger 11 in such a manner as to be effective to oppose any movement of the control valve plunger 11 in either direction by reason of compression thereof.

The control valve plunger 11 is provided with control edges 22, 43 effective to cooperate with corresponding control portions of the control valve housing 10. A supply line 23 supplies fluid medium under pressure by means of a pump 24 from the reservoir 25 to the annular pressure space 26 and to the pressure space 26' formed within the control valve housing 10.

A channel 27 connects the annular pressure space 26 and space 26' with a restoring plunger 29 disposed within a cylinder bore 28 provided at the upper end of the control valve plunger 11. The restoring plunger abuts with the upper end thereof against the control valve housing 10 whereas the lower piston surface thereof is subjected to the pressure prevailing in the spaces 26 and/or 26'.

A channel 32 which leads through a radial bore into an annular groove 32a in the control valve plunger 11 is adapted to establish a communication between a supply line 33 terminating in annular recess 33a and a cylinder bore 30 disposed adjacent to and in parallel to the cylinder bore 28. The cylinder bore 30 accommodates a control plunger 31, the function of which will be described more fully hereinafter.

The control valve plunger 11 itself is constructed essentially symmetrically. A restoring plunger 29' and a control plunger 31' which correspond to the restoring plunger 29 and the control plunger 31 at the upper end of the control valve plunger 11 are arranged in corresponding cylinder bores 28' and 30' provided in the control valve plunger 11 at the opposite end thereof. Channels 27' and 32' leading to the cylinder bores 28' and 30' correspond to channels 27 and 32.

Fluid medium under pressure is supplied to supply lines 33 and 33' terminating in annular recesses or spaces 33a and 33a' respectively from the reservoir 25 through a pump 37 and a line 38 leading to a pressure regulating valve 34 to be described more fully hereinafter. The branch line 33' connected to the supply line 33 leads into the corresponding annular space 33a' in the housing 10 adapted to communicate with the annular groove 32a', a radial bore and channel 32'.

A discharge valve 39 is provided with a differential piston consisting of a large piston member 40 and a relatively smaller piston member 40'. The differential piston 40, 40' is spring-loaded and is actuated by the pressure prevailing in line 33 over a branch line 41 connected with the supply line 33 behind the pressure regulating valve 34. A line 23' connects the left hand of the differential piston 40' with the output of pump 24. A discharge line 42 which is throttled or controlled by the piston part 40' leads back to the reservoir 25.

The centrifugal governor transmits its movement in response to variations in the speed to the spool-type valve 35, 35' over pin 36' thereof which abuts against the spring-loaded spool-type valve 35, 35' and displaces the latter during axial movements. The slidable valve member 35' controls the bypass of fluid from line 38 back to the reservoir through line 38'.

*Operation*

If the steering spindle 2 is rotated in the direction of arrow 18, the steering gear nut member 4 together with the sleeve member 4' performs an axial movement on the steering spindle 2 and as a result of the connection over lever 7, the steering shaft 6 is rotated in a corresponding direction.

However, as the steering spindle 2 is initially rotated in the direction of arrow 18, the steering gear nut member 4 together with the actuating arm 8 is also rotated in the same direction as arrow 18, i.e., counterclockwise thereby moving the control-valve plunger 11 in the direction of arrow 19. The actuating arm 8 is provided at the forward end thereof with an elongated ledge member 8' which is disposed perpendicularly to the axial direction of the control-valve plunger 11 and which slidably engages in a collar at the control-valve plunger 11 whereby engagement of the actuating arm or member 8' with the control-valve plunger 11 is assured even when the steering gear nut member 4 is moved to one or the other end position thereof on the steering spindle 2.

With a very small initial angular displacement of the steering spindle 2 and therewith of the steering gear nut member 4 and of arm 8, the control-valve plunger 11 is moved against the tension of spring 20 which is effective in either direction of movement of the control-valve plunger 11. After traversal of the distance 21 by the control-valve plunger 11, which in actuality, may amount to but a few tenths of a millimeter, the control edge 22 of control-valve plunger 11 shuts off the flow of oil to passage 17 from supply line 23 to which oil is supplied by pump 24 from the reservoir 25.

By closing the gap leading from space 26 to passage 17 and existing between the housing 10 and control edge 22 after movement of the distance 21, pressure is built up in the space 26' provided in control-valve plunger housing 10 which pressure is transmitted through passage or line 12 to chamber 15 of the servo cylinder 13 whereby the steering movement initiated at the steering wheel is effectively aided by the force exerted on piston 14 and piston rod 14' connected with some point in the steering linkage or steering mechanism.

The pressure in the space 26' becomes effective over channel 27 provided in control valve plunger 11 in the cylinder 28 accommodating the restoring plunger 29 which is arranged in the end of the control-valve plunger 11 and which supports itself against the housing 10. The pressure in cylinder 28 thus acts on restoring plunger 29 and thereby effects a restoring force on the control-valve plunger 11 in a direction opposite to that of arrow 19 which restoring force is transmitted again through arm 8 to the steering nut member 4 and therewith to the steering spindle 2 and steering wheel.

The control plunger 31 which is accommodated in cylinder 30 and is disposed in the control-valve plunger 11 next to the cylinder 28 for restoring plunger 29 receives pressure through the channel 32 from the supply line 33 connected to a speed-responsive pressure regulating means, such as a pressure regulating valve 34 in which a slide valve member 35, 35' is arranged that is actuated by a flywheel governor 36 over spindle 36'. The flywheel governor 36 rotates at a speed proportional to the speed of the vehicle so that the pressure to the control plunger 31 is also proportional to the vehicle speed. Fluid is delivered to the pressure regulating valve 34 by pump 37 from the operating fluid reservoir 25 through line 38.

For purposes of varying the force-transmission characteristic of the servo mechanism, an automatic discharge valve 39 may be interconnected at the output side of pump 24 into the servo-steering mechanism according to FIGURE 1 by means of a branch line 41 connected to line 33, the differential piston areas 40, 40' of which are loaded or actuated by the fluid pressure in line 41 which itself is dependent on the vehicle speed and which in dependency on this prevailing pressure influences the delivery of operating fluid through line 23 to the control-valve plunger 11 by more or less opening a discharge passage 42.

Since it may be assumed that the output of pump 24 is constant, the pressure supplied to the left-hand side of piston part 40' over line 23' is also constant at any time. Consequently, any variation in the pressure prevailing in line 33 and therewith in line 41 as a result of the pressure control valve 35 upsets the equilibrium of the discharge valve 39 by reason of the fact that the area of the piston part 40 is much greater than that of the piston part 40'.

When the speed of the centrifugal governor 36 increases the spindle 36' thereof moves toward the right, thereby closing the discharge line 38' by means of the piston 35'. As a result thereof, the pressure in line 33 will build up. Such increased pressure will also tend to move the differential piston 40, 40' toward the right against the effect of a spring whereby the piston part 40' increasingly opens the discharge line 42 so as to reduce at the same time the pressure in line 23.

Thus, as the speed increases, not only is the pressure in line 33 increased, thereby increasing the restoring force exerted on the control valve plunger 11 by restoring pistons 31 or 31', but also the pressure in line 23 is reduced so as to reduce the effectiveness of the servo-mechanism as such.

If the speed of the vehicle decreases, the sequence of operation is the reverse, namely the pressure in line 33 decreases and the pressure in line 23 increases.

Both pumps 24 and 37 may be drivingly connected to the engine so that they operate when the engine of the motor vehicle runs. The pump 24 thereby supplies the servo piston 14 and the restoring piston 29 and the pump 37 supplies pressure to the control piston 31 corresponding to the vehicle speed.

With a rotation of the steering gear nut member 4 in the direction opposite that of arrow 18, the control edge 43 of the control-valve plunger 11 closes off the space 26 in the housing 10 from the supply line 23. As a result thereof, the control-value plunger 11 controls the flow of the fluid pressure medium in such a manner that only servo-cylinder chamber 16 is supplied therewith over line 17 in control valve plunger housing 10 whereby the servo piston 14 in the servo cylinders 13 is actuated by the pressure fluid medium only from the side thereof corresponding to chamber 16. At the same time oil delivery takes place from line 23 to the restoring plunger 29' through channel 27' as well as from line 33 and branch line 33' to control plunger 31' through channel 32'. The line 33' is connected to supply line 33 and leads into the housing 10 of the control valve plunger 11 to thereby establish a communication with the channel 32'.

In an arrangement as illustrated in FIGURE 1, where the piston rod 14 is connected to the steering mechanism and therethrough to the steering shaft 6, there is a mechanical feedback from the rod 14' by reduction in resistance to the turning of the steering spindle 2 and a resulting tendency of the steering gear nut to return the valve plunger 11 to its neutral positoin. However, the aforementioned action of the restoring plungers 29 and 29' and the control plungers 31 and 31' is in addition to any restoring tendency due to this feedback from the piston rod 14' through the steering mechanism.

In the arrangement according to FIGURE 2, an actuating arm 45 which is attached to the steering-gear nut member 44 is in slidable contact by the ledge member 45' with a control-valve plunger 46 slidably guided in the housing 47 of the steering mechanism similar to the arrangement of FIGURE 1. Operating fluid, such as oil, is effectively supplied from the reservoir 50 by pump 51 arranged in line 52 to the space 52' and is selectively delivered by control edges 48 and 49 of the control-valve plunger 46, in accordance with the position of the lever 45, either into the space 53 or into the space 54 formed in the housing 47. The space 53 is in communication over line 55 with the cylinder chamber 57 disposed to one side of the servo piston 58 in the servo cylinder 56. On the other hand, the space 54 in the housing 47 is in communication with the cylinder chamber 60 in the servo cylinder 56 over line 59.

Lines 61 and 62 branch off from lines 55 and 59 respectively to deliver operating fluid to the structurally-similar piston pressure balances generally designated by reference numerals 63 and 63' where the fluid pressure acts upon the pistons 64 and 64'. The piston rods 65 and 65' of the pistons 64 and 64' are linked together with respective piston rods 68 and 68' of the pressure reducing valves 69 and 69' by means of joints 66 and 66' and scale-beam members 67 and 67'. The pivot pins 70 and 70' of the scale beam members 67 and 67' are arranged at levers 71 and 71' and are moved therewith in elongated openings 73 and 73' in the scale beam members 67 and 67' as the levers 71 and 71' are rotated about the pivot points 72 and 72' thereof.

The pressure reducing valves 69 and 69' are connected to lines 62 nad 61, respectively, through lines 74 and 74'. Furthermore, lines 75 and 75' lead from the pressure reducing valves 69 and 69' to the housing 47 of the control-valve plunger 46 and from there through passages 76 and 76' into the cylinders 77 and 77' in which regulating plungers 78 and 78' are slidably arranged which in turn abut against the end walls of the housing 47.

The ends 79 and 79' of the levers 71 and 71' are appropriately pivotally connected to a single rod 80 attached to a regulating piston 82 slidably arranged in a cylinder 81. Fluid is delivered to the cylinder 81 over line 83 by pump 84 from a reservoir 50. In the line 83 between the pump 84 and cylinder 81, a pressure control valve member generally designated by reference numeral 85 is inserted which is formed as part of a centrifugal governor 90 driven proportional to the speed of the motor vehicle.

*Operation*

The operation of the arrangement in FIGURE 2 is analogous to that of FIGURE 1 insofar as the spindle 2, the balls 3 and the nut member 44, as well as actuating arm 45 and control plunger 46 are concerned. If the spindle 2 is rotated clockwise, as viewed in FIGURE 2, then the actuating arm 45 will also rotate clockwise and will thereby move the control plunger 46 downwardly with the effect that the control edge 49 begins to throttle the space 53 whereas pressure is permitted to build up in space 54 which is thereupon applied to the space 60 in the servo cylinder. If the spindle 2 is rotated in the counterclockwise direction, the control valve plunger 46 is moved upwardly and the control edge 48 will begin to throttle the space 54 whereby pressure will build up in space 53 which will be applied to the space 51 of the servo-cylinder 56.

The operation of the device described thus far of FIGURE 2 is identical with that of FIGURE 1. However, the control mechanism effecting control of the servo forces and of the return forces on the control valve plunger 46 differ from that of FIGURE 1.

As the speed of the centrifugal governor 90 increases the pressure control valve member 85 closes more and more the discharge passage 89 by means of the piston member 91 thereof whereby the pressure in line 83 and therewith in cylinder 81 is increased. As a result thereof, the piston 82 is moved in the direction of arrow 86 and thereby moves, by means of piston rod 80, the levers 71 and 71' together with the pivot points or pins 70 and 70' thereof so that the pivot pins 70 and 70' move within the elongated openings 73 and 73' in the scale beam members 67 and 67' in the direction of arrows 87 and 87'. By this movement, the reducing valve pistons 88 and 88' are moved upwardly and lines 75 and 75' receive auxiliary pressure, the magnitude of which, in relation to the pressure on the piston 58 in the servo cylinder 56 is dependent on the speed of the motor vehicle. The areas of the pistons 64 and 64' and of the pistons 88 and 88' in the reducing valves 69 and 69' are equal.

In the position of levers 71 and 71' and pivot points 70 and 70' indicated in FIGURE 2, the ratio of the pressures in the servo motor to the pressures in the lines 75 and 75' approach unity. The pressure in lines 75 and 75', reduced proportionally to the reduction in speed of travel, i.e., the restoring pressure being proportional to vehicle speed, act on the regulating plungers 78 and 78' respectively in the control valve plunger 46 and thereby exert a restoring force through the control valve plunger 46 and through actuating arm 45 of the steering gear nut member 44 on the steering wheel (not shown).

In the illustrated embodiments, two pumps are used for delivery of the hydraulic media from the reservoirs to the servo-steering mechanism. Instead of two pumps, only one pump may be provided to deliver the hydraulic media to a pressure accumulator from which the steering mechanism may be supplied. Instead of by means of an actuating arm on the steering gear nut member, the control valve plunger may also be actuated by other control members, for instance, by such members which are responsive to the rotation of the steering spindle arranged between the steering wheel and steering gear. Furthermore, the servo-cylinder may be made an integral part of the steering mechanism in which case, as was already disclosed in the copending application Serial No. 664,318, filed June 7, 1957, entitled "Servo Steering Mechanism for Motor Vehicles," the sleeve member froms the servo-piston in the steering mechanism housing.

Moreover, it is also understood that instead of the steering-gear nut member arrangement shown in FIGURE 3 to enable relative rotational movement between the ball member 5, on the one hand, and the actuating arm 8 and ledge member 8' on the other, an arrangement by means of appropriate bearings may be used as shown and described in the aforementioned co-pending application.

While we have shown and described two preferred embodiments in accordance with the present invention, it is understood that the same is not limited thereto but is susceptible of many changes and modifications within the spirit of the present invention and we intend to cover all such changes and modifications as defined by the appended claims.

We claim:

1. A servo-steering mechanism for motor vehicles with means for translating the rotary movement of a steering spindle having a worm into steering movement of a steering shaft by means of a steering gear nut member mounted on said worm and by means of anti-friction ball means engaging said spindle worm and said steering gear nut member comprising power steering means for selectively aiding the steering movement initiated at said steering spindle in a manner inversely proportional to the speed of travel of said motor vehicle including a control valve means, a steering servomotor connected to said shaft and controlled by said valve means, actuating means operatively connected with said steering gear nut member for actuating said control valve means in response to slight rotary movements of said steering gear nut member to initiate operation of said power steering means, and hydraulic control means responsive to the vehicle speed for applying to said control valve means a restoring force proportional to the vehicle speed to oppose the actuating force exerted thereon from said steering spindle over said steering gear nut member and said actuating means, said hydraulic control means including a pressure responsive actuator for applying said restoring force directly to said control valve means.

2. A servo-steering mechanism according to claim 1, wherein said power steering means further comprises means defining a cylinder space and piston means operatively connected to said steering shaft, said piston means dividing said cylinder space into two parts forming a servo motor, and wherein said control valve means is operative to selectively supply power fluid under pressure to one side or the other of said piston means into said cylinder to thereby aid the steering movement of said steering mechanism.

3. A servo steering mechanism for motor vehicles according to claim 1, wherein the magnitude of aid to said steering movement from said power steering means is zero at a predetermined vehicle speed and a maximum at zero and low vehicle speeds.

4. A servo steering mechanism for motor vehicles provided with a steering spindle having a worm and a movable steering gear nut member mounted on said worm by means of anti-friction ball means, steering shaft means, and connecting means connecting said shaft means with said nut member, comprising power steering means for selectively aiding the steering movement initiated at said steering spindle in such a manner that the magnitude of said aid is variably dependent on the speed of travel of said motor vehicle, said power steering means including control valve means provided with a plurality of cylinders, actuating means operatively connected with said steering gear nut member for actuating said control valve means by the rotary movement of said steering gear nut member from the neutral position thereof to initiate operation of said power steering means, and hydraulic control means responsive to the vehicle speed for actuating said control valve means in a direction toward said neutral position, said hydraulic control means including a pressure regulating valve, control plungers provided in said cylinders of said control valve means and hydraulically connected with said pressure regulating valve, a source of fluid pressure for supplying hydraulic medium to said regulating valve, and a speed governor operatively connected to rotate at a speed proportional to the speed of said vehicle and being in operative connection with said pressure regulating valve so as to regulate the same to thereby regulate the pressure to said control plungers in relation to said vehicle speed.

5. A servo-steering mechanism according to claim 4, further comprising a housing for said control valve means and wherein said control valve means is further provided at each end thereof with a cylinder space, a restoring plunger for each of said cylinder spaces, and wherein said cylinder spaces are connected with respective pressure chambers formed in said housing for said control valve means to return said control valve means to said neutral position thereof by the pressure in the respective cylinder space.

6. A servo-steering mechanism for motor vehicles with a housing for said control valve means according to claim 4, wherein one of said control plungers is arranged in each of said cylinders at each end of said control valve means and disposed substantially parallel to the longitudinal axis thereof, and further comprising a spring between each of said control plungers and said cylinders, said control plungers extending beyond said control valve plunger and abutting against said housing thereof.

7. A servo-steering mechanism for motor vehicles according to claim 6, wherein said cylinders are supplied with pressure fluid through passages in said control valve means.

8. A servo-steering mechanism for motor vehicles according to claim 4, wherein said pressure regulating valve itself is formed as a centrifugal governor.

9. A servo-steering mechanism for motor vehicles provided with a steering spindle having a worm and a movable steering gear nut member mounted on said worm by means of anti-friction ball means, a steering shaft having a lever arm at one end thereof, and connecting means connecting said lever arm with said nut member, comprising power-steering means including a servo-medium circuit for providing aid to the steering movement of said steering spindle in such a manner that the magnitude of said aid is variably dependent on the speed of travel of said motor vehicle, said power-steering means including a control valve member, actuating means connected with said steering gear nut member for actuating said control valve member in a direction away from its neutral position by the rotary movement of said steering gear nut member to initiate operation of said power-steering means, and hydraulic means including a control fluid circuit responsive to the vehicle speed for actuating said control valve member in a direction toward the neutral position including automatic discharge valve means with a discharge passage and hydraulically connected to said control fluid and servo-medium circuits in such a manner that a pressure increase in said control fluid circuit effects a reduction of the pressure in said servo-medium circuit by opening of said discharge passage.

10. A servo-steering mechanism for motor vehicles according to claim 9, wherein said automatic discharge valve means comprises differential piston means having two different piston areas, means connecting said servo-medium circuit to said automatic discharge valve means at one side of one of said pistons, and means for connecting said control fluid circuit to permit fluid therein to act on said different piston areas, said piston means being movable in response to pressure in said control fluid circuit to control the opening of said discharge passage.

11. A servo-steering mechanism for motor vehicles provided with a steering spindle having a worm and a movable steering gear nut member mounted on said worm by means of anti-friction ball means, a steering shaft having a lever arm at one end thereof, and connecting means connecting said lever arm with said nut member, comprising power-steering means including a servo-medium circuit for providing aid to the steering movement of said steering spindle in such a manner that the magnitude of said aid is variable dependent on the speed of travel of said motor vehicle, said power steering means including a control valve member, actuating means including said steering gear nut member for actuating said control valve member in a direction away from the neutral position thereof by the rotary movement of said steering gear nut member to initiate operation of the power steering means, and hydraulic control means having a control fluid circuit and responsive to the vehicle speed and including a source of fluid pressure, a pressure regulating valve, a regulating piston controlled by said regulating valve, said servo-medium circuit including a piston pressure balance means including a scale beam, pivot means for supporting said beam, said pivot means being movable along said beam, and link means operatively connecting said pivot means with said regulating piston, said pressure balance means further including a piston and a pressure reducing valve connected with said servo-medium circuit, and control plungers engaged in said control valve member hydraulically actuated by fluid from said pressure reducing valve in dependence on said vehicle speed.

12. A servo-steering mechanism according to claim 11, wherein the area of said piston and said pressure reducing valve in said piston pressure balance are substantially equal.

13. A servo-steering mechanism according to claim 11, wherein said power steering means further comprises a cylinder space, and piston means operatively connected to said steering shaft, said piston means dividing said cylinder space into two parts, and wherein said hydraulic control means is operative to selectively supply servo-medium under pressure to one side or the other of said piston means into said cylinder so as to aid the steering movement of the steering mechanism.

14. A servo-steering mechanism according to claim 13, wherein two of said piston pressure balance means are arranged in parallel with each other, and wherein one said piston pressure balance means is in hydraulic communication with one side of said piston means while the other of said balance means is in communication with the other side of said piston means.

15. A servo-steering mechanism for motor vehicles having steerable wheels and including steering gear nut means operatively connected with the steering spindle by anti-friction means, and means adapted to transmit the axial steering movement of said steering gear nut means to the steerable wheels, the combination comprising power-steering means for effectively aiding the steering movement initiated at said steering spindle, a source of pressure fluid, means for supplying said pressure fluid to said power steering means including control valve means to selectively actuate said power steering means, speed responsive pressure regulating means driven at a speed proportional to the vehicle speed for varying the pressure of at least a part of said pressure fluid inversely proportionally to said vehicle speed, further means controlled by said controlled part of said pressure fluid to variably counteract the effect of said power-steering means, actuating means operatively connected with said steering gear nut means for actuating said control valve means by the slight rotary movements of said steering gear nut means, said further means including restoring plunger means operatively connected with said control valve means to effectively oppose movement of said control valve means by said actuating means in predetermined relation to said vehicle speed, and means to supply said part of said pressure fluid to said restoring plunger means.

16. A servo-steering mechanism for motor vehicles having steerable wheels and including steering gear nut means operatively connected with the steering spindle by anti-friction means, and means adapted to transmit the axial steering movement of said steering gear nut means to the steerable wheels, the combination comprising power-steering means for effectively aiding the steering movement initiated at said steering spindle, a source of pressure fluid, means for supplying said pressure fluid to said power steering means including control valve means to selectively actuate said power steering means, speed responsive pressure regulating means driven at a speed proportional to the vehicle speed for varying the pressure of at least a part of said pressure fluid inversely proportionally to said vehicle speed, further means controlled by said controlled part of said pressure fluid to variably counteract the effect of said power-steering means, actuating means operatively connected with said steering gear nut means for actuating said control valve means by the slight rotary movements of said steering gear nut means, and means for hydraulically varying the other part of said pressure fluid supplied to said power steering means in proportion to said vehicle speed.

17. A servo-steering mechanism for motor vehicles having steerable wheels and including steering gear nut means operatively connected with the steering spindle by anti-friction means, and means adapted to transmit the axial steering movement of said steering gear nut means to the steerable wheels, the combination comprising power-steering means for effectively aiding the steering movement initiated at said steering spindle, a source of pressure fluid, means for supplying said pressure fluid to said power steering means including control valve means to selectively actuate said power steering means, speed responsive pressure regulating means driven at a speed proportional to the vehicle speed for varying the pressure of at least a part of said pressure fluid inversely proportionally to said vehicle speed, further means controlled by said controlled part of said pressure fluid to variably counteract the effect of said power-steering means, actuating means operatively connected with said steering gear nut means for actuating said control valve means by the slight rotary movements of said steering gear nut means, said further means includes plunger means operatively connected with said control valve means, pressure balance means, pressure reducing valve means controlled by said pressure balance means, means for supplying the fluid of said power-steering means through said pressure reducing valve means to said plunger means, said pressure balance means having variable pivot means, and means controlled by said part of said pressure fluid for adjusting the postion of said pivot means in response to variations of said vehicle speed.

18. A servo-steering mechanism for motor vehicles having steerable wheels and including steering gear nut means operatively connected with a steering spindle by anti-friction means for moving said nut means axially of said spindle for steering said wheels in response to rotation of the spindle, and means adapted to transmit the axial steering movement of said steering gear nut means to the steerable wheels, the combination comprising power-steering means including a servo-motor having a fluid-actuated displaceable member for effectively aiding the steering movement initiated at said steering spindle, a source of pressure fluid, means for supplying said pressure fluid to said power steering means including control valve means to selectively control actuation of said displaceable member, actuating means operatively connected with said steering gear nut means for actuating said control valve means by slight rotary movements of said steering gear nut means, speed responsive pressure regulating means driven at a speed proportional to the vehicle speed for varying the pressure of at least a part of said pressure fluid inversely proportionally to said vehicle speed, further means controlled by said controlled part of said pressure fluid to variably counteract the actuation of said control valve means by said actuating means for varying the aiding effect of said power steering means in accordance with vehicle speed, said power steering means providing feedback through the steering mechanism from said displaceable member through said steering gear nut means to said control valve means for restoring the latter toward an inactive position in response to displacement of said displaceable member, said aforementioned further means providing said variable counteraction to vary the restoring effect of said feedback.

19. A servo-steering mechanism for motor vehicles having steerable wheels including a steering gear nut means operatively connected with a steering spindle by anti-friction means for moving said nut means axially of said spindle for steering said wheels in response to rotation of the spindle, and means adapted to transmit the axial steering movement of said steering gear nut means to the steerable wheels, the combination comprising power steering means including a servo-motor having a fluid-actuated displaceable member connected to the steering mechanism for effectively aiding the steering movement initiated at said steering spindle, a source of pressure fluid, means for supplying said pressure fluid to said power steering means including control valve means to selectively control the flow of said pressure fluid to said servo-motor, actuating means operatively connected with said steering gear nut means for actuating said control valve means by slight rotary movements of said steering gear nut means, speed responsive pressure regulating means driven at a speed proportional to the vehicle speed for hydraulically controlling the net power-steering servo force produced by said pressure fluid inversely in proportion to said vehicle speed, said power steering means providing feedback through the steering mechanism from said displaceable member and through said steering gear nut means to said control valve means for restoring the latter toward a neutral position in response to displacement of said power driven member, hydraulic means including a pressure-responsive actuator which is controlled by said pressure regulating means and operatively connected for exerting a force on said control valve means to vary the restoring effect of said feedback to assist in achieving control of said net servo force inversely in proportion to vehicle speed.

References Cited in the file of this patent

UNITED STATES PATENTS 2,063,937    Kundig _____ Dec. 15, 1936

(References on following page)

UNITED STATES PATENTS

| | | | |
|---|---|---|---|
| 2,341,502 | Ingres | Feb. 8, | 1944 |
| 2,356,492 | Smith | Aug. 22, | 1944 |
| 2,433,651 | Creson et al. | Dec. 30, | 1947 |
| 2,487,618 | Twyman | Nov. 8, | 1949 |
| 2,605,854 | MacDuff | Aug. 5, | 1952 |
| 2,682,778 | Creson et al. | July 6, | 1954 |
| 2,734,589 | Groen | Feb. 14. | 1956 |
| 2,748,881 | Holley | June 5, | 1956 |
| 2,755,778 | Loofbourrow et al. | July 24, | 1956 |
| 2,760,590 | Stolte | Aug. 28, | 1956 |
| 2,791,287 | Stolte | May 7, | 1957 |